US012756342B2

(12) United States Patent
Rouquette et al.

(10) Patent No.: US 12,756,342 B2
(45) Date of Patent: Oct. 6, 2026

(54) CONTROLLER OF AN ELECTRICAL POWER SUPPLY CIRCUIT FOR ELECTRICAL POWER SUPPLY OF A SUPERCONDUCTING MOTOR, SUPERCONDUCTING ELECTRICAL POWER SUPPLY SYSTEM OF A MOTOR, AND AIRCRAFT COMPRISING SUCH A SYSTEM

(71) Applicant: Airbus SAS, Blagnac (FR)

(72) Inventors: Jean-François Rouquette, Blagnac (FR); Christian Fallouh, Blagnac (FR)

(73) Assignee: Airbus SAS, Blagnac (FR)

( * ) Notice: Subject to any disclaimer, the term of this patent is extended or adjusted under 35 U.S.C. 154(b) by 194 days.

(21) Appl. No.: 18/890,023

(22) Filed: Sep. 19, 2024

(65) Prior Publication Data

US 2026/0088740 A1 Mar. 26, 2026

(30) Foreign Application Priority Data

Sep. 21, 2023 (FR) ....................................... 2310010

(51) Int. Cl.
*H02P 21/22* (2016.01)
*B64D 31/16* (2024.01)

(52) U.S. Cl.
CPC .............. *H02P 21/22* (2016.02); *B64D 31/16* (2024.01)

(58) Field of Classification Search
CPC ................................ H02P 21/22; B64D 31/16
See application file for complete search history.

(56) References Cited

U.S. PATENT DOCUMENTS 5,063,472 A 11/1991 Van Doan et al.
2002/0149331 A1* 10/2002 Marcinkiewicz .... B23K 20/121 318/254.1
2006/0176009 A1* 8/2006 Okai ......................... F02K 3/04 318/727

FOREIGN PATENT DOCUMENTS

JP H03235656 A 10/1991
WO 2019146271 A1 8/2019

OTHER PUBLICATIONS

French Search Report for corresponding French Patent Application No. 2310010 dated May 2, 2024.

* cited by examiner

*Primary Examiner* — Zoheb S Imtiaz
(74) *Attorney, Agent, or Firm* — Greer, Burns & Crain, Ltd.

(57) ABSTRACT

A control method executed by a circuit for controlling a power supply circuit of an electric motor, the power supply circuit comprising an inverter supplying the motor via a power supply link, the control method comprising a detection of an increase in the voltage on the terminals of the power supply link by monitoring the sum of the voltages of a balanced three-phase power supply system together with an inhibition of an output configured for controlling the inverter if the sum of the voltages exceeds a predetermined value for a predetermined duration. Also a circuit for controlling a power supply circuit configured for executing the method.

7 Claims, 3 Drawing Sheets

CONTROLLER OF AN ELECTRICAL POWER SUPPLY CIRCUIT FOR ELECTRICAL POWER SUPPLY OF A SUPERCONDUCTING MOTOR, SUPERCONDUCTING ELECTRICAL POWER SUPPLY SYSTEM OF A MOTOR, AND AIRCRAFT COMPRISING SUCH A SYSTEM

CROSS-REFERENCES TO RELATED APPLICATIONS

This application claims the benefit of French Patent Application Number 2310010 filed on Sep. 21, 2023, the entire disclosure of which is incorporated herein by way of reference.

FIELD OF THE INVENTION

The present invention relates to a motor referred to as 'superconducting motor', notably of the type usable for the propulsion of an aircraft. The invention relates more particularly to the monitoring and the control of a superconducting power supply link for an aircraft electric motor (engine) supplied from an inverter, and to an aircraft.

BACKGROUND OF THE INVENTION

The aeronautical industry is undergoing profound changes in terms of design of aircraft, with the aim of significant reductions in carbon dioxide and nitrogen oxide emissions, owing to restrictions with regard to ecology and to sustainable development.

The use of liquid hydrogen as an energy source for an aircraft is a promising route to achieve this. Hydrogen may be used in a fuel cell for generating electricity, or directly as fuel in a power unit. Moreover, studies are specifically oriented at optimizing the electrical or hybrid propulsion systems of aircraft and hydrogen present in liquid form on board an aircraft may be used to enhance the performance of the electrical equipment by decreasing its resistivity and by consequently reducing the losses by Joule effect. It is also possible to use superconducting components. Superconducting conductors may be used for the distribution of AC current in architectures comprising electric motors powered by controlled electronic power converters, such as inverters. In such architectures for electrical power supply of a motor, the superconducting link between the inverter and the motor must be protected against an unexpected transition from the superconducting state to the conventional state (a transition usually referred to as 'quench' in the superconducting field). It is therefore important to be able to detect signs which are precursors of such a transition in order to avoid an excess of losses by Joule effect able to damage the electrical power supply circuits and their near environment.

The detection of the quench of a superconducting conductor is generally carried out by monitoring the voltage on the terminals of the latter and by detecting the appearance of an increase in the voltage level at its terminals. Although the detection of a quench on a link carrying a DC current (called DC link) is fairly simple since it involves discriminating a zero or non-zero impedance (i.e., resistance) of the conductor, this is not the case for a link carrying an AC current (called AC link). Indeed, in the latter case, the inductive component of the impedance is never zero and is even higher than the resistive component in most cases, which interferes with or even prevents a detection of the quench with usual means. There accordingly exists a need to obtain a rapid, reliable, and low-cost solution allowing the inductive effect on the voltage on the terminals of the conductor or conductors of the electrical power supply link of the motor to be overcome.

The situation can be improved.

SUMMARY OF THE INVENTION

One subject of the present invention is to provide a power supply circuit controller for an electric motor supplied with AC current, capable of detecting in a fast and reliable manner the appearance of a phenomenon of the quench type in an electrical power supply link to a motor, so as to limit the current or currents delivered to the motor by an inverter when the power supply link between the inverter and the motor starts to go from a nominal superconducting state to a state in which its resistivity is increasing.

For this purpose, a method is provided for controlling a power supply circuit of an electric motor, the power supply circuit comprising a power converter, called inverter, configured for delivering three AC voltages starting from a DC voltage source and a superconducting three-phase power supply link comprising three electrical power supply lines configured for powering the electric motor, the method being executed by a power supply control circuit comprising a power supply circuit controller, which controller comprises at least one control output configured for controlling the inverter, the method being such that it comprises:

i) obtaining a first signal representative of a potential difference between the ends of a first line, from amongst the three electrical power supply lines of the three-phase power supply link, ii) obtaining a second signal representative of a potential difference between the ends of a second line, from amongst the three electrical power supply lines of the three-phase power supply link, iii) obtaining a third signal representative of a potential difference between the ends of a third line, from amongst the three electrical power supply lines of the three-phase power supply link, iv) determining a sum signal representative of the sum of the first signal, of the second signal and of the third signal, and, v) if the sum signal thus determined exceeds a predetermined threshold value, inhibiting the control output of the said controller, otherwise, repeating the steps i) to v).

Advantageously, it is thus possible to detect in a reliable and fast manner, and with limited means, the appearance of a quench phenomenon in a superconducting power supply link of an electric motor supplied with AC current.

According to one embodiment, the method for controlling a power supply circuit furthermore comprises, between the steps iii) and iv), a low-pass filtering of the sum signal determined.

Another subject of the invention is a circuit for controlling a power supply circuit of an electric motor, the power supply circuit comprising a power converter, called inverter, configured for delivering three AC voltages starting from a DC voltage source and a superconducting three-phase power supply link comprising three electrical power supply lines configured for supplying the said electric motor, the said control circuit comprising a power supply circuit controller comprising at least one control output configured for controlling the said inverter, and the control circuit comprising electronic circuitry configured for:

i) obtaining a first signal representative of a potential difference between the ends of a first line, from amongst the three electrical power supply lines of the three-phase power supply link, ii) obtaining a second signal representative of a potential difference between the ends of a second line, from amongst the three electrical power supply lines of the three-phase power supply link, iii) obtaining a third signal representative of a potential difference between the ends of a third line, from amongst the three electrical power supply lines of the three-phase power supply link, iv) determining a sum signal representative of the sum of the said first signal, of the said second signal and of the said third signal, and for, v) if the said sum signal exceeds a predetermined threshold value, inhibiting the said control output, otherwise, repeating the steps i) to v).

Advantageously, the circuit for controlling a power supply circuit furthermore comprises filtering circuitry (or circuit) configured for performing a low-pass filtering of the sum signal determined.

Another subject of the invention is an electrical power supply system for an electric motor comprising a circuit for controlling a power supply circuit such as previously described.

Another subject of the invention is an aircraft comprising at least one circuit for controlling a superconducting power supply circuit such as previously described or an electrical power supply system such as the aforementioned.

Lastly, another subject of the invention is a computer program product comprising program code instructions for executing the steps of a method such as previously described, when this program is executed by a processor of a circuit for controlling an electrical power supply circuit.

BRIEF DESCRIPTION OF THE DRAWINGS

The aforementioned features of the invention, together with others, will become more clearly apparent upon reading the following description of one exemplary embodiment, the said description being presented in relation with the appended drawings.

DETAILED DESCRIPTION OF THE PREFERRED EMBODIMENTS

Figure 1:
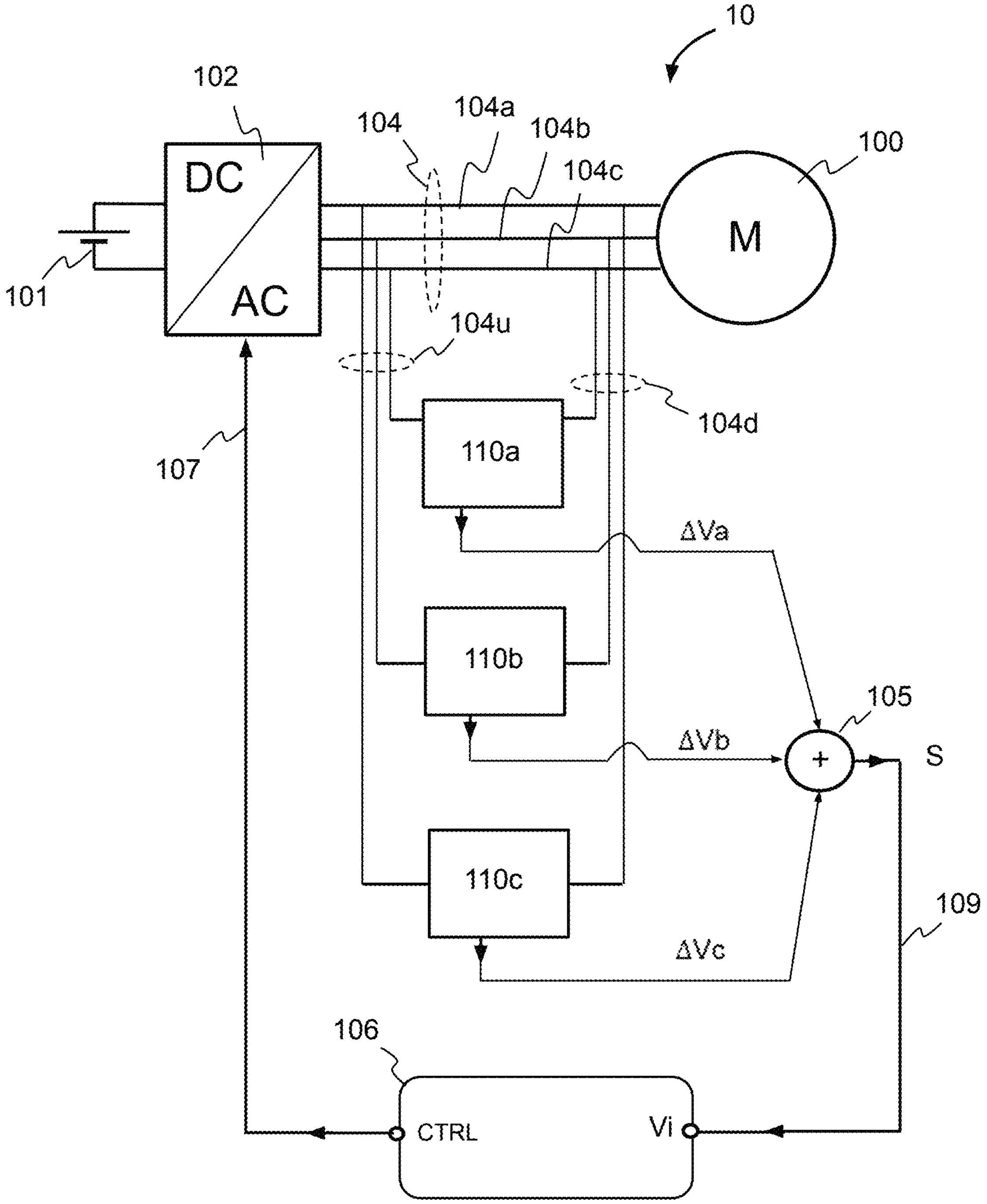
FIG. 1 illustrates schematically a circuit for controlling an electrical power supply circuit of an electric motor operating in an electrical power supply system of an aircraft motor (engine), according to one embodiment.

FIG. 1 is a schematic representation of an electrical power supply system 10 configured for electrically powering an electric motor 100, according to one embodiment. According to the example described here, the electric motor 100 is an aircraft motor (engine). For this purpose, the electrical power supply system 10 comprises a control circuit itself comprising a power supply circuit controller 106 for controlling an inverter 102 supplying a superconducting electrical power supply link 104 connected to the electric motor 100. The inverter 102 performs power converter functions and supplies a balanced three-phase electrical network of voltages to the electric motor 100, via the superconducting power supply link 104, starting from a DC voltage source 101. The balanced three-phase electrical network comprises a first electrical power supply line 104*a*, a second electrical power supply line 104*b* and a third electrical power supply line 104*c*. These three electrical power supply lines jointly compose the superconducting power supply link 104.

In order to control the power supply system 10 of the electric motor 100, the controller 106 of the power supply circuit control circuit comprises at least:

- a current control output CTRL configured for current control of the inverter 102, and,
- an input, Vi, configured for receiving a signal S representative of a sum of three signals ΔVa, ΔVb and ΔVc, themselves representative of voltages respectively measured on the terminals of each of the power supply lines 104*a*, 104*b* and 104*c* of the superconducting power supply link 104. The signal S is formed by an adder circuit 105 which comprises an output (hence that which delivers the signal S) and three inputs onto which are respectively applied the signals ΔVa, ΔVb and ΔVc representative of voltages respectively measured on the terminals of each of the power supply lines 104*a*, 104*b* and 104*c*.

Circuits 110*a*, 110*b* and 110*c* for determining a difference of potentials are used so as to each deliver a signal whose content or whose amplitude is representative of an electrical potential difference applied to these inputs.

Three-phase links (or connection buses) 104*u* and 104*d* configured for carrying out measurements of electrical potentials respectively connect the upstream and downstream ends of the superconducting electrical power supply link 104 to the circuits 110*a*, 110*b*, 110*c* for determining potential differences. Thus, the circuit 110*a* delivers the signal ΔVa representative of the potential difference between the ends of the electrical power supply link 104*a*; the circuit 110*b* delivers the signal ΔVb representative of the potential difference between the ends of the electrical power supply link 104*b* and the circuit 110*c* delivers the signal ΔVc representative of the potential difference between the ends of the electrical power supply link 104*c*. According to one embodiment, the signals ΔVa, ΔVb and ΔVc are analogue signals and the adder circuit 105 is configured for delivering a signal S whose amplitude is the sum of these three analogue signals. According to another embodiment, the signals ΔVa, ΔVb and ΔVc are digital signals (logic words) and the adder circuit 105 is configured for delivering a signal S also in the form of a digital signal (a logic word) whose value is the sum of these three digital signals (these three logic words, for example signed integers of 16 bits width).

The control of the inverter 102 by the power supply circuit controller 106 uses a connection link 107. According to one embodiment, the connection link 107 carries a signal of the pulse width modulation (acronym PWM) type generated by control circuits and modules carrying out a control of the inverter of the vector control type.

According to one embodiment, the three power supply lines 104*a*, 104*b* and 104*c* of the superconducting power supply link 104 are arranged within the same cryogenic volume. According to one variant, each of the power supply lines 104*a*, 104*b* and 104*c* of the superconducting power supply link 104 is arranged in a cryogenic volume dedicated to it.

In any case, a detection of an increase in the potential difference on at least one of the power supply lines connected to one of the circuits 110*a*, 110*b* or 110*c* for determining the potential difference suffices to carry out a quench detection and to define subsequent operations useful for the preservation and for safe shutdown of the systems, since the sum of the voltages of the three-phase electrical power supply link is no longer in this case zero or close to zero.

According to one variant embodiment, a single module for determining potential difference 110 comprises internal multiplexing circuits for performing a sequential scanning (monitoring) of the potential differences between the two ends of each of the electrical power supply lines 104*a*, 104*b* and 104*c*, successively and iteratively, and the digital adder circuit 105 carries out an addition of three values respectively representative of the voltages on the terminals of the electrical power supply lines 104*a*, 104*b* and 104*c*, received within a reduced interval of time.

Ingeniously and advantageously, the power supply circuit controller 106 carries out processing and operations based on the sum S of the potential differences respectively measured on the terminals of the electrical power supply lines 104*a*, 104*b* and 104*c*, via the modules for determining a potential difference 110*a*, 110*b* and 110*c*, and its input Vi.

According to one embodiment, its internal electronic circuitry is configured for inhibiting the control output CTRL (command) from the inverter 102 only if the sum S exceeds a predetermined threshold value for at least a predetermined threshold duration or for a duration exceeding this threshold duration.

The terms "inhibit the control output of the inverter" here denote any operation subsequent to the detection of the exceeding of the threshold value (which could be for a duration equal to or exceeding a threshold duration) and aimed at limiting the thermal dissipation by Joule effect in the superconducting power supply link 104, by limiting the current delivered by the inverter 102 in each of the electrical power supply lines 104*a*, 104*b* and 104*c* or by interrupting the operation of the inverter 102. This inhibition of the control output CTRL (command) configured for controlling the inverter 102 will here be termed "safety shutdown of the inverter 102".

According to one variant embodiment, the circuits 110*a*, 110*b* and 110*c* for determining a difference of potentials and/or the adder circuit 105 are integrated into the controller 106 of the electrical power supply link 104, and the electrical lines of the connection bus 104*u* and 104*d* are then directly connected to inputs of the controller 106 of the electrical power supply link 104.

According to one exemplary embodiment, the inhibition of the output CTRL defines a degraded mode of operation of the inverter 102, at reduced power. According to another exemplary embodiment, the inhibition of the output CTRL isolates the DC voltage source 101 of the inverter 102. These exemplary embodiments are non-limiting and other modes for controlling the power dissipated in the electrical power supply link 104, via the control output CTRL of the inverter 102, may of course be implemented.

Figure 2:
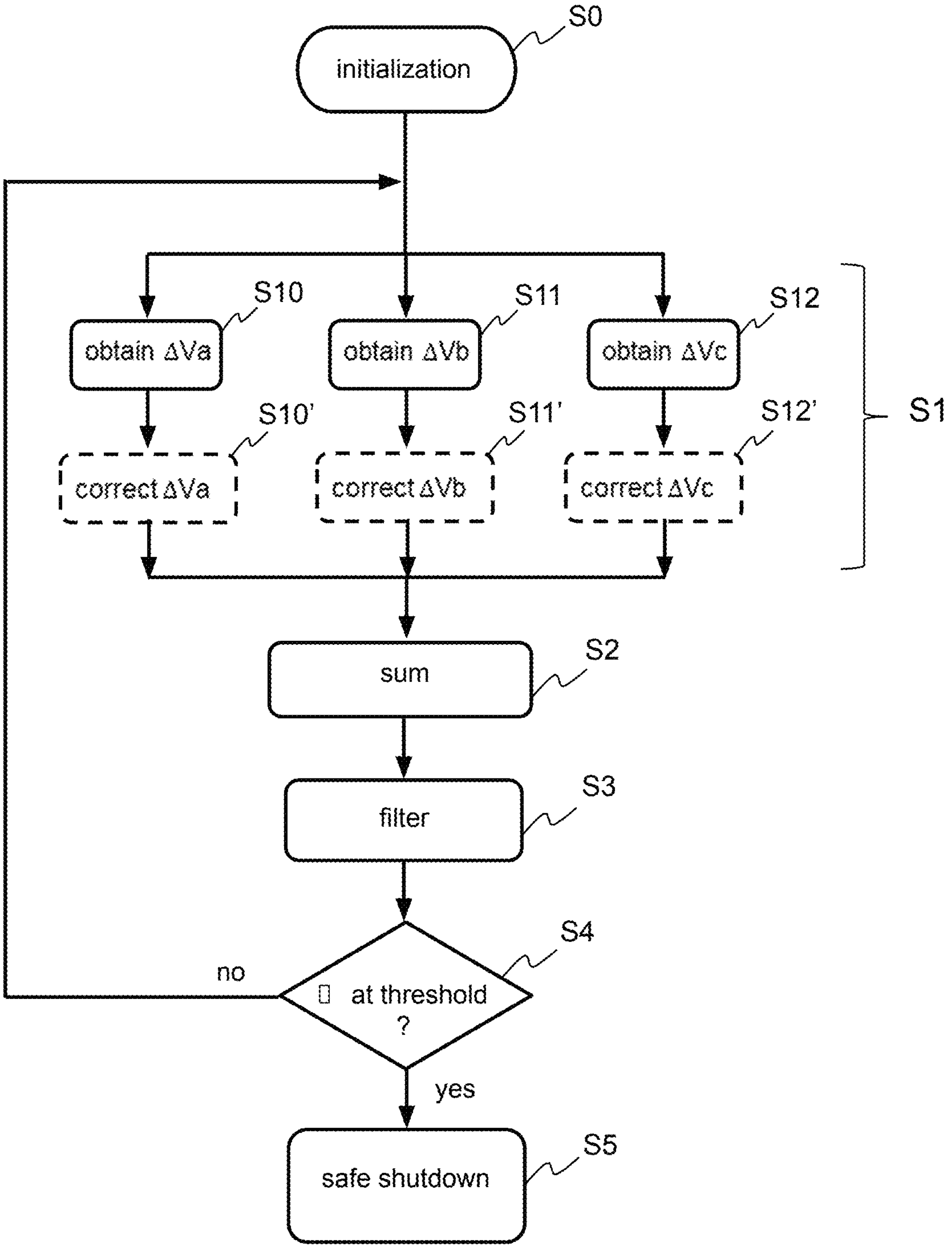
FIG. 2 is a flow diagram illustrating a method for controlling an electrical power supply circuit of an electric motor, executed in an electrical power supply system of an aircraft motor (engine), according to one embodiment.

FIG. 2 is a diagram of the flow chart type which illustrates steps of a method for controlling the power supply link 104 of the electrical power supply system 10 of the electric motor 100, executed for all or in part by the controller 106 of the power supply circuit (and hence of the power supply link 104), according to one embodiment.

A step S0 comprises operations for initializing and for configuring all of the systems present aimed at obtaining a nominal state defined as a normally operational configuration for a use of the electric motor 100 and of its electrical power supply circuit 10.

A step S1 comprises an acquisition of the signals ΔVa, ΔVb and ΔVc at the output of the circuits 110*a*, 110*b* and 110*c*, respectively, for determining a difference of potentials between the ends of the power supply link 104, for each of the power supply lines 104*a*, 104*b* and 104*c*. According to the example described, this step S1 may be decomposed into three steps S10, S11 and S12 carried out in parallel (in other words simultaneously and independently of one another). During the step S10, the circuit 110*a* determines the signal ΔVa so as to deliver it on a first input of the adder circuit 105; during the step S11, the circuit 110*b* determines the signal ΔVb so as to deliver it on a second input of the adder circuit 105; and, during the step S12, the circuit 110*c* determines the signal ΔVa so as to deliver it on a third input of the adder circuit 105.

During a step S2, the adder circuit 105 sums the three signals ΔVa, ΔVb and ΔVc and delivers the sum signal S=ΔVa+ΔVb+ΔVc on its output. This signal S must be substantially close to zero in the absence of a quench phenomenon, since the power supply link 104 is a link of the balanced three-phase type for which, in theory, the sum of the voltages is always zero. The signal S thus determined is applied at the input Vi of the power supply circuit controller 106 via an electrical link 109.

According to one embodiment, the three signals ΔVa, ΔVb and ΔVc are corrected, respectively during optional steps S10', S11' and S12', before being summed during the step S2 by the adder circuit 105. For example, each of the three signals ΔVa, ΔVb and ΔVc may be filtered, or a gain may be applied to each of these signals ΔVa, ΔVb and ΔVc, or a time offset may be applied to each of these signals ΔVa, ΔVb and ΔVc.

A filtering step S3, for example a low-pass filtering, is subsequently carried out by the power supply circuit controller 106 so as to filter the result of the addition, namely the previously determined signed sum S. This filtering allows the spurious noise to be eliminated, but also the potential imperfections of the system to be attenuated, such as an imbalance between the phases. The signal resulting from the filtering applied is subsequently compared to a predetermined threshold value during a step S4. Indeed, if the sum S of the three signals ΔVa, ΔVb and ΔVc is supposed to be zero in theory, the uncertainty and disparities inherent in the hardware implementation of the three power supply lines 104*a*, 104*b* and 104*c*, and also in the output stages of the inverter 102 and in the electric motor 100, are such that, in practice, this sum, although close to zero in the absence of a quench phenomenon, is not completely zero. This is why, rather than comparing it with zero, it should be compared with a reduced threshold value determined by analyses and/or experimentations in the laboratory in the systems in question.

In the case where the value S compared with the threshold value exceeds the predetermined threshold value, and hence in the presence of a quench phenomenon, the control output CTRL of the inverter 102 is inhibited during a step S5 for safe shutdown of the electrical power supply system 10 so as to preserve the integrity of the power supply systems of the electric motor 100 present. This state is transmitted to the inverter via a control line 107 connecting the controller 106 to the inverter 102. In the opposite case, and hence in the absence of a quench phenomenon detected in the superconducting electrical power supply link 104, the method implemented by a control circuit comprising the power supply circuit controller 106 loops back to the step S1 in order to carry out a new iteration of the steps of the method described hereinabove. Optionally, during the step S4, and after detection of an exceeding of the predetermined threshold value, it is verified that the exceeding of the predetermined threshold value is detected for at least one predetermined duration in order to authorize the inhibition operations of the step S5; otherwise, if the exceeding of the predetermined threshold value only occurs for a time less than the predetermined threshold duration and then is absorbed, the method continues sequentially looping back starting from the step S1. According to one embodiment, such a spurious detection leads to a configuration of supervision systems for controlling the electrical power supply circuit 10 of the motor 100.

According to one embodiment, the aforementioned predetermined duration threshold value is determined by calculation or during operational tests in a research and development laboratory, or else during validation and/or accreditation tests. According to one embodiment, these two threshold values are programmable, preferably remotely via a remote control interface of the control circuit and of the power supply circuit controller 106.

The steps of the method described hereinabove may be implemented interchangeably by hardware circuitry, by software functions or by a combination of these two forms of implementation.

According to one variant embodiment, the steps S10, S11 and S12 are carried out sequentially by a single circuit 110*a* for determining potential difference which uses a multiplexer at the input so as to successively connect to the power supply lines 104*a*, 104*b* then 104*c* and a demultiplexer at the output in order to supply the signals ΔVa, ΔVb and ΔVc to the adder circuit 105.

Figure 3:
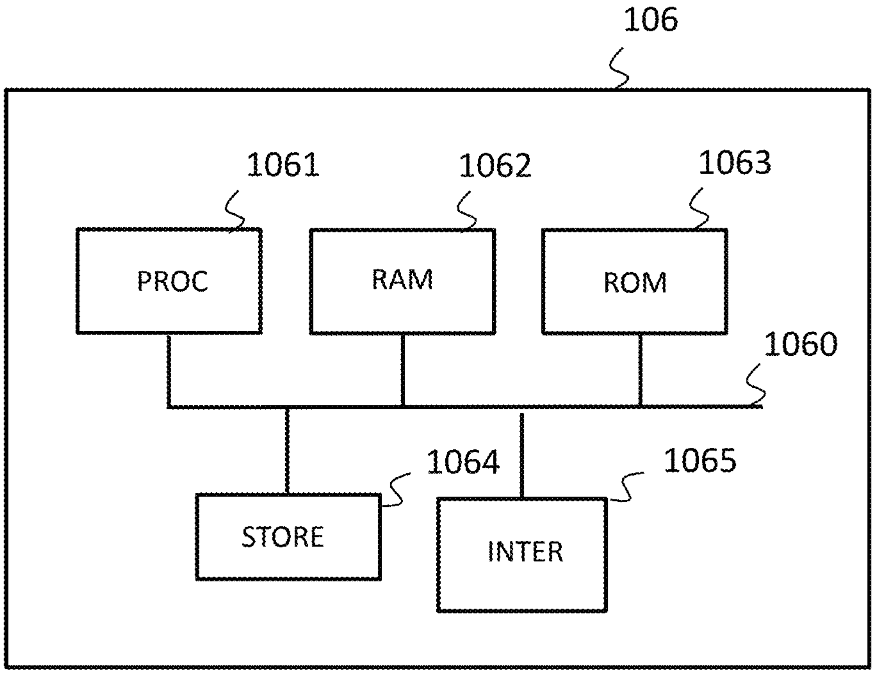
FIG. 3 illustrates schematically one exemplary internal architecture of a circuit for controlling a power supply circuit already shown in FIG. 1; and, FIG. 4 illustrates an aircraft comprising an electrical power supply system comprising a circuit for controlling an electrical power supply circuit according to one embodiment.

FIG. 3 is a diagram illustrating one exemplary internal architecture of the circuit for controlling a power supply circuit or else of the power supply circuit controller 106, according to one embodiment. It is noted that FIG. 3 could also illustrate schematically one example of hardware architecture of a processing module included in the power supply circuit controller 106 or comprising the power supply circuit controller 106, aside from other modules configured for performing other functions connected with the implementation of the method.

According to the example of hardware architecture shown in FIG. 3, the control circuit or as the case may be the power supply circuit controller 106 then comprises, connected via a communications bus 1060: a processor or CPU (Central Processing Unit) 1061; a volatile memory RAM (Random Access Memory) 1062; a non-volatile memory ROM (Read Only Memory) 1063; a storage unit such as a hard disk (or a storage medium reader, such as an SD (Secure Digital) card reader 1064; at least one interface module 1065 allowing the power supply system controller 106 to communicate with devices present in the power supply system 10 such as, for example, the inverter 102, the modules for determining a potential difference 110*a*, 110*b* or 110*c* and the electric motor 100. Advantageously, the interface module INTER 1065 notably comprises input-output ports, inputs of converters of the digital/analogue type and of converters of the analogue/digital type, pulse-width modulated controlled outputs, and more generally all types of interfaces useful for the management of a system for supplying a motor with a three-phase current source of the type of an inverter operating starting from a DC current source. In particular, the interface module INTER 1065 of the controller 106 is configured for notably carrying out vector control functions of an inverter such as the inverter 102.

The processor 1061 is capable of executing instructions loaded into the RAM 1062 from the ROM 1063, from an external memory (not shown), from a storage medium (such as an SD card), or from a communications network. When the power supply circuit controller 106 is powered up, the processor 1061 is capable of reading program code instructions from the RAM 1062 and of executing them. These instructions form a computer program causing the implementation, by the processor 1061, of all or part of a method described in relation with FIG. 2, or of all or part of the variants described of this method.

All or part of the method described in relation with FIG. 2, or its variants described, may be implemented in the form of software by execution of a set of instructions by a programmable machine, for example a DSP (Digital Signal Processor) or a microcontroller, or be implemented in the form of hardware by a machine or dedicated component, for example an FPGA (Field-Programmable Gate Array) or an ASIC (Application-Specific Integrated Circuit). In general, the power supply circuit controller 106 comprises electronic circuitry configured for implementing the methods described in relation with the control circuit or the power supply circuit controller 106. It goes without saying that the power supply circuit controller 106 furthermore comprises all the elements usually present in a system comprising a control unit and its peripherals, such as a power supply circuit, a power supply supervision circuit, one or more clock circuits, a reset-to-zero circuit, related input-output ports, interrupt inputs, bus drivers (or controllers), this list being non-exhaustive.

Figure 4:
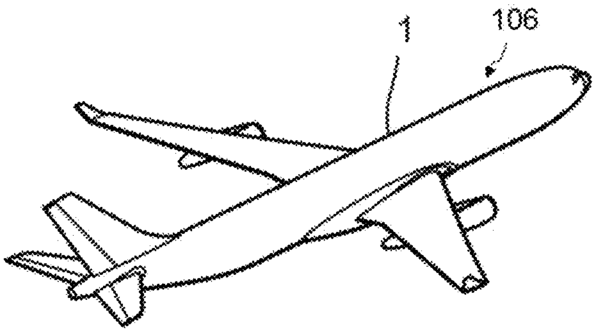

FIG. 4 illustrates an aircraft 1 comprising the electrical power supply system 10 previously described, which system comprises a control circuit itself comprising the power supply circuit controller 106. The use of such a system on board an aircraft powered by at least one electric motor such as the electric motor 100 allows an enhanced level of safety to be provided in the case of appearance of a quench phenomenon on an electrical power supply link of a motor.

Furthermore, the ingenious use of a low-pass filter circuit, potentially with a cut-off frequency controlled as a function of the frequency of rotation of the motor, allows a compromise to be obtained between the bandwidth of the signals for which a protection is implemented and the rejection of the unwanted signals of higher frequency.

Finally, an implementation according to the embodiments described advantageously allows the level of safety to be substantially increased while at the same time being simple and with a very limited addition of hardware resources.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for controlling a power supply circuit of an electric motor, the power supply circuit comprising a power converter, called an inverter and configured for delivering three AC voltages starting from a DC voltage source and a superconducting three-phase power supply link comprising three electrical power supply lines configured for supplying the electric motor, the said method being executed by a power supply control circuit comprising a power supply circuit controller comprising at least one control output (CTRL) configured for controlling the inverter, the method comprising i) obtaining a first signal (ΔVa) representative of a potential difference between ends of a first line selected from the three electrical power supply lines of the three-phase power supply link, ii) obtaining a second signal (ΔVb) representative of a potential difference between ends of a second line selected from the three electrical power supply lines of the three-phase power supply link, iii) obtaining a third signal (ΔVc) representative of a potential difference between ends of a third line from the three electrical power supply lines of the three-phase power supply link, iv) determining a sum signal (S) representative of a sum of the first signal (ΔVa), of the second signal (ΔVb), and the third signal (ΔVc), and, v) when the sum signal exceeds a predetermined threshold value, inhibiting the at least one control output (CTRL), otherwise, repeating steps i) to v).

2. The method for controlling a power supply circuit according to claim 1, further comprising, between the steps iii) and iv), a low-pass filtering of the sum signal (S).

3. A circuit for controlling a power supply circuit of an electric motor, the power supply circuit comprising a power converter, called an inverter and configured for delivering three AC voltages starting from a DC voltage source and a superconducting three-phase power supply link comprising three electrical power supply lines configured for supplying the electric motor, the circuit comprising a power supply circuit controller comprising at least one control output (CTRL) configured for controlling the said inverter, the circuit comprising:

electronic circuitry configured for:

i) obtaining a first signal (ΔVa) representative of a potential difference between ends of a first line selected from the three electrical power supply lines of the three-phase power supply link, ii) obtaining a second signal (ΔVb) representative of a potential difference between ends of a second line selected from the three electrical power supply lines of the three-phase power supply link, iii) obtaining a third signal (ΔVc) representative of a potential difference between ends of a third line selected from the three electrical power supply lines of the three-phase power supply link, iv) determining a sum signal (S) representative of a sum of the first signal (ΔVa), the second signal (ΔVb), and the third signal (ΔVc), and, v) when the sum signal (S) exceeds a predetermined threshold value, inhibiting the at least one control output (CTRL), otherwise, repeating the steps i) to v).

4. The circuit according to claim 3, further comprising:

filtering circuitry configured for performing a low-pass filtering of the sum signal (S).

5. An electrical power supply system of an electric motor comprising:

the circuit according to claim 3.

6. An aircraft comprising:

at least one circuit according to claim 3.

7. A non-transitory computer readable medium comprising: a computer program comprising instructions for executing the method according to claim 1, when the program is executed by a processor of a circuit for controlling an electrical power supply circuit.

* * * * *